United States Patent
Wang et al.

(10) Patent No.: US 10,421,370 B2
(45) Date of Patent: Sep. 24, 2019

(54) COORDINATED CONTROL METHOD FOR A DISTRIBUTION NETWORK WITH DER AND EV AND CONTROL SYSTEM THEREOF

(71) Applicant: ABB Schweiz AG, Baden (CH)

(72) Inventors: Zhao Wang, Beijing (CN); Yao Chen, Beijing (CN); Hector Zelaya De La Parra, Vasteras (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/648,718

(22) PCT Filed: Jan. 15, 2013

(86) PCT No.: PCT/CN2013/070443
§ 371 (c)(1),
(2) Date: Jun. 1, 2015

(87) PCT Pub. No.: WO2014/110708
PCT Pub. Date: Jul. 24, 2014

(65) Prior Publication Data
US 2015/0314696 A1 Nov. 5, 2015

(51) Int. Cl.
*B60L 11/00* (2006.01)
*H02J 3/48* (2006.01)
(Continued)

(52) U.S. Cl.
CPC .............. *B60L 53/63* (2019.02); *B60L 55/00* (2019.02); *H02J 3/382* (2013.01); *H02J 3/48* (2013.01);
(Continued)

(58) Field of Classification Search
CPC ... B60L 11/1842; B60L 11/1844; H02J 3/382; H02J 3/48; H02J 3/50; H02J 13/0006;
(Continued)

(56) References Cited

U.S. PATENT DOCUMENTS 6,496,342 B1* 12/2002 Horvath ................. H02H 7/261
361/62
2008/0039980 A1* 2/2008 Pollack ................... B60L 53/57
700/295
(Continued)

FOREIGN PATENT DOCUMENTS

CN 102655335 A 9/2012
CN 102708425 A 10/2012
(Continued)

OTHER PUBLICATIONS

ISA/CN International Search Report dated Oct. 17, 2013 re PCT Application No. PCT/CN2013/070443, filed Jan. 15, 2013.
(Continued)

*Primary Examiner* — Stephen Holwerda
(74) *Attorney, Agent, or Firm* — J. Bruce Schelkopf; Taft Stettinius & Hollister LLP

(57) ABSTRACT

A coordinated control method for a distribution network with DER and EV and coordinated control system thereof includes acquiring information from at least one DER controller, at least one EV controller and/or at least one load controller; calculating P/Q references and/or circuit breaker control commands for the DER, the EV and the load based on active/reactive power balance, voltage and/or frequency requirement; allocating the references and/or the control commands to the DER, the EV and the load based on their locations and available capacity; and outputting the allocated references and/or control commands to the DER, the EV and the load. The solutions minimize negative impacts from DER and EVs and maintain a controllable voltage and frequency stabilization.

14 Claims, 8 Drawing Sheets

(51) Int. Cl.
*H02J 3/50* (2006.01)
*H02J 7/00* (2006.01)
*B60L 53/63* (2019.01)
*H02J 3/38* (2006.01)
*H02J 13/00* (2006.01)
*B60L 55/00* (2019.01)

(52) U.S. Cl.
CPC ............... *H02J 3/50* (2013.01); *H02J 7/007* (2013.01); *H02J 7/0052* (2013.01); *H02J 13/0006* (2013.01); *H02J 7/0027* (2013.01); *Y02B 70/3216* (2013.01); *Y02E 60/721* (2013.01); *Y02T 10/7005* (2013.01); *Y02T 10/7055* (2013.01); *Y02T 10/7072* (2013.01); *Y02T 10/7094* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 20/221* (2013.01); *Y04S 30/12* (2013.01)

(58) Field of Classification Search
CPC ........ H02J 7/0052; H02J 7/007; H02J 7/0027; Y02T 90/168; Y02T 10/7005; Y02T 10/7055; Y02T 10/7072; Y02T 10/7094; Y02T 90/121; Y02T 90/128; Y02T 90/14; Y02T 90/163; Y04S 30/12; Y04S 10/126; Y04S 20/221; Y02E 60/721; Y02B 70/3216
See application file for complete search history.

(56) References Cited

U.S. PATENT DOCUMENTS

| | | |
|---|---|---|
| 2008/0143304 A1 | 6/2008 | Bose et al. |
| 2009/0091291 A1* | 4/2009 | Woody ............... B60K 6/48 320/109 |
| 2010/0225275 A1* | 9/2010 | Bucur ............... H02J 7/0019 320/116 |
| 2010/0289451 A1* | 11/2010 | Tuffner ............... H02J 7/34 320/109 |
| 2011/0204717 A1* | 8/2011 | Shaffer ............... G06Q 40/04 307/18 |
| 2012/0133209 A1 | 5/2012 | O'Brien et al. |
| 2012/0271576 A1* | 10/2012 | Kamel ............... H02J 13/0006 702/62 |
| 2012/0286723 A1 | 11/2012 | Ukita et al. |
| 2013/0006434 A1* | 1/2013 | Bush ............... H02J 3/14 700/293 |
| 2013/0043725 A1* | 2/2013 | Birkelund ............... G06Q 10/04 307/24 |

FOREIGN PATENT DOCUMENTS

| | | |
|---|---|---|
| CN | 101901945 A | 12/2012 |
| WO | WO2012037722 A1 | 3/2012 |

OTHER PUBLICATIONS

Supplemental European Search Report and Written Opinion, Application No. EP 13871316.9, dated Sep. 12, 2016, 10 pp.
First Chinese Office Action, Application No. CN 201380069368.7, dated Sep. 28, 2016, 6 pp.
Rodríguez-Amendo, J.L. et al., "Operation and coordinated control of fixed and variable speed wind farms," 2008, pp. 406-414.
European Office Action, European Patent Application No. 13871316.9, dated Aug. 13, 2018, 6 pages.
Indian Examination Report, Indian Application No. 2480/CHENP/2015, dated Jan. 1, 2019, 5 pages.
European Patent Office, Examination Report in corresponding Application No. 13871316.9, dated Jun. 28, 2019, 6 pp.

\* cited by examiner

COORDINATED CONTROL METHOD FOR A DISTRIBUTION NETWORK WITH DER AND EV AND CONTROL SYSTEM THEREOF

FIELD OF THE INVENTION

The invention relates to the distribution network with distributed energy resource (DER) and electric vehicle (EV), and more particularly to a coordinated control method for a distribution network and coordinated control system thereof.

BACKGROUND OF THE INVENTION

Due to the growing concerns over problems, such as energy shortage vs. ever-increasing primary energy and electricity demand, greenhouse gas emission from conventional power plant and transportation vs. global climate change, etc., worldwide governments are investing several billion dollars to fund the development of DER generation and electrified transportation in recent years. Widespread distributed generation and charging infrastructure are under planning or construction which will bring fundamental changes to the existing distribution network structure. The power flow pattern will be changed firstly from unidirectional to bi-directional. Re-evaluation is required toward network losses, congestion levels and voltage profiles, etc. Power quality issues like harmonics and flickers will be aggravated by power electronic interfaces and fluctuating and intermittent characteristics of DERs and EV charging. The peak-valley difference will be enlarged if the generation or charging profile is not dispatchable. Existing network upgrade is indispensable to accommodate large scale DER and EV charging without proper control strategies.

In order to accommodate these changes, minimize the negative impact, and even take utilization of the controllability of distribution generation and EV charging, the primary equipment as well as the management systems of distribution network need to become smarter than before. For example, the transformers should be able to monitor the operation conditions of themselves to avoid unplanned outage; the management systems should be able to forecast the generation curve from a given wind turbine or photovoltaic (PV) panel and probability density of EV loading; and the communication system should be bi-directional for both data acquisition and supervisory control, etc. With these capabilities, we can realize the coordinated control to optimize the operation of the distribution network during both grid-connection and islanding operation.

However, for operating the distribution network with DER and EV charging infrastructure integration, there are at least three potential problems need to be solved.

1, Both DER and EV charging have fluctuating power demand characteristics. Usually the distribution transformers will not be designed according to the maximum possible power demand for cost considerations. Therefore, it is possible that the transformers will be overloaded from time to time which might accelerate the equipment aging and lead to undesired tripping. To solve this problem, both active and reactive (P/Q) power exchange among the network and DERs, EVs and the loads should be measured and controlled in a coordinated way according to the condition monitoring information of the transformers at different locations.

2, The fluctuation of DER generation and EV charging will lead to potential voltage variation and flickering. If the distribution network is connected into a strong main grid, the impacts will be relatively small. However under certain operation mode or for some rural networks, the grid connection is usually weak, the voltage fluctuation might influence the normal operation of loads or other equipment. To solve this problem, distributive EV charging infrastructure with four-quadrant operation capability can be controlled concertedly to maintain the voltage profile of the network.

3, In theory, it is feasible for a regional distribution network to be operated in the islanding mode if the local generation capacity is enough to support the local loads. Usually a synchronous generator will be switched in as the main power source to control the voltage and the frequency. The power output from DERs can help to supply partial load and reduce fuel consumption and carbon dioxide emission. However in the other hand, the intermittent output from DER will bring side effects on voltage and frequency stability of the generator. To solve this problem without sacrificing DER generation, the control of distributive EV charging infrastructure, taking into consideration of energy storage capacity from the vehicle batteries or the storage batteries, should be designed to support generator side voltage and frequency control.

Hence, a new control method or control system need to be developed to solve the above mentioned problems.

SUMMARY OF THE INVENTION

To overcome the problems mentioned above, the present invention proposes a coordinated control method for a distribution network and coordinated control system thereof.

According to an aspect of the present invention, it provides a coordinated control method for a distribution network with DER and EV. The coordinated control method comprises: acquiring information from at least one DER controller, at least one EV controller and/or at least one load controller; calculating total P/Q references and/or circuit breaker control commands for the DER, the EV and the load based on active/reactive power balance, voltage and/or frequency requirement; allocating the references and/or the control commands to the DER, the EV and the load based on their locations and available capacity; and outputting the allocated references and/or control commands to the DER, the EV and the load.

According to a preferred embodiment of the present invention, the information includes voltages, currents, condition indicators, forecast results, status of circuit breakers and acceptable voltage levels, in which the voltages can be used to calculate the actual frequency; the voltages and currents be used to calculate the actual P/Q; the condition indicators include transformer condition monitoring data; in which the transformer can be a transformer for the distribution network, the DER, the EV and/or the load; the forecast results include the DER generation capacity, EV charging/discharging capacity and/or loading level; and the status of circuit breakers include "on/off" status.

According to a preferred embodiment of the present invention, the acquiring information step further comprises: acquiring main grid references from a DMS, in which the main grid references comprise a given range of voltage level of the PCC of the distribution network and a given range of P/Q exchange between the distribution network and the main grid.

According to a preferred embodiment of the present invention, the coordinated control method further comprises: feeding back the distribution network information to the DMS, in which the distribution network information includes the total active/reactive power consumption of the distribution network, the voltage level of the PCC of the distribution network and the status of circuit breaker which connects the distribution network to the main grid.

According to a preferred embodiment of the present invention, the circuit breaker can be composed of a single circuit breaker or a number of parallel circuit breakers.

According to a preferred embodiment of the present invention, the calculating P/Q references and/or circuit breaker control commands further comprises: calculating the transformers permissible overloading capacities based on condition indicators; and calculating P/Q constrains for the PCC of the distribution network, the DER, the EV and the load based on the transformers overloading capacities, the given range of P/Q exchange between the distribution network and the main grid, and/or the forecast results; in which the P/Q constrains include both maximum constrains and minimum constrains.

According to a preferred embodiment of the present invention, the coordinated control method further comprises: identifying whether the calculated actual P/Q satisfy the P/Q constrains; and if not, calculating the incremental P/Q references and/or circuit breaker commands for the DER, the EV and/or the load.

According to a preferred embodiment of the present invention, the coordinated control method further comprises: identifying whether the actual frequency satisfies a preset frequency range; and if not, calculating the incremental P references and/or circuit breaker commands for the DER, the EV and/or the load.

According to a preferred embodiment of the present invention, the coordinated control method further comprises: identifying whether actual voltages satisfy the acceptable voltage levels; and if not, calculating the incremental Q references and/or circuit breaker commands for the DER, the EV and/or the load.

According to a preferred embodiment of the present invention, the total P/Q references for the DER, the EV and/or the load can be updated by adding up the incremental P/Q references.

According to a preferred embodiment of the present invention, the calculating incremental P/Q references and/or circuit breaker commands for the DER, the EV and/or the load further comprises: if the actual P of PCC of the distribution network is higher than the P maximum constrain of the distribution network, and/or the actual frequency of the distribution network is lower than the preset frequency range, the incremental P reference and/or circuit breaker commands of the DER increase the power generation based on the forecast results and P constrains of the DER; if still not satisfy or the actual P of the DER reaches the P constrain of the DER, the incremental P reference and/or circuit breaker commands of the EV decrease charging power and/or increase discharging power based on the forecast results and P constrains of the EV; and if still not satisfy or the actual P of the EV reaches the P constrain of the EV, the incremental P reference and/or circuit breaker commands of the load decrease loading level based on the forecast results and P constrains of the load.

According to a preferred embodiment of the present invention, the calculating incremental P/Q references and/or circuit breaker commands for the DER, the EV and/or the load further comprises: if the actual P of PCC of the distribution network is lower than the P minimum constrain of the distribution network, and/or the actual frequency of the distribution network is higher than the preset frequency range, the incremental P reference and/or circuit breaker commands of the load will increase the loading level based on the forecast results and P constrains of the load; if still not satisfy or the actual P of the load reaches the P constrains of the load, the incremental P reference and/or circuit breaker commands of the EV will increase charging power and/or decrease discharging power based on the forecast results and P constrains of the EV; and if still not satisfy or the actual P of the EV reaches the P constrain of the EV, the incremental P reference and/or circuit breaker commands of the DER will decrease the power generation based on the forecast results and P constrains of the DER.

According to a preferred embodiment of the present invention, the calculating incremental P/Q references and/or circuit breaker commands for the DER, the EV and/or the load further comprises: if the actual Q of PCC of the distribution network is higher than the Q constrain of the distribution network, and/or the actual voltages inside the distribution network are lower than the acceptable voltage levels, the incremental Q reference and/or circuit breaker commands of the EV will decrease inductive Q and/or increase capacitive Q based on the Q constrains of the EV; if still not satisfy or the actual Q reaches the Q constrain of the EV, the incremental Q reference and/or circuit breaker commands of the DER will decrease inductive Q and/or increase capacitive Q based on the Q constrains of the DER; and if still not satisfy or the actual Q reaches the Q constrain of the DER, the incremental Q reference and/or circuit breaker commands of the load will decrease inductive Q and/or increase capacitive Q based on the Q constrains of the load.

According to a preferred embodiment of the present invention, the calculating incremental P/Q references and/or circuit breaker commands for the DER, the EV and/or the load further comprises: if the actual Q of PCC of the distribution network is lower than the Q constrain of the distribution network, and/or the actual voltages inside the distribution network are higher than the acceptable voltage levels, the incremental Q reference and/or circuit breaker commands of the EV will increase inductive Q and/or decrease capacitive Q based on the Q constrains of the EV; if still not satisfy or the actual Q reaches the Q constrain of the EV, the incremental Q reference and/or circuit breaker commands of the DER will increase inductive Q or decrease capacitive Q based on the Q constrains of the DER; and if still not satisfy or the actual Q reaches the Q constrain of the DER, the incremental Q reference and/or circuit breaker commands of the load will reduce inductive Q and/or decrease capacitive Q based on the Q constrains of the load.

According to the other aspect of the present invention, it provides a coordinated control system for a distribution network with DER and EV. The coordinated control system comprises: an acquiring module, configured to acquire information from at least one DER controller, at least one EV controller and/or at least one load controller; a calculating module, configured to calculate total P/Q references and/or circuit breaker control commands for the DER, the EV and the load based on active/reactive power balance, voltage and/or frequency requirement; an allocating module, configured to allocate the references and/or the control commands to the DER, the EV and the load based on their locations and available capacity; and an outputting module, configured to output the allocated references and/or control commands to the DER, the EV and the load.

According to another preferred embodiment of the present invention, the information includes voltages, currents, condition indicators, forecast results, status of circuit breakers and acceptable voltage levels, in which the voltages can be used to calculate the actual frequency; the voltages and currents be used to calculate the actual P/Q; the condition indicators include transformer condition monitoring data; in which the transformer can be a transformer for the distribution network, the DER, the EV and/or the load; the forecast results include the DER generation capacity, EV charging/discharging capacity and/or loading level; and the status of circuit breakers include "on/off" status.

According to another preferred embodiment of the present invention, the acquiring module further acquires main grid references from a DMS, in which the main grid references comprise a given range of voltage level of the PCC of the distribution network and a given range of P/Q exchange between the distribution network and the main grid.

According to another preferred embodiment of the present invention, the coordinated control system further comprises: a feedback module, configured to feed back the distribution network information to the DMS, in which the distribution network information includes the total active/reactive power consumption of the distribution network, the voltage level of the PCC of the distribution network and the status of circuit breaker which connects the distribution network to the main grid.

According to another preferred embodiment of the present invention, the circuit breaker can be composed of a single circuit breaker or a number of parallel circuit breakers.

According to another preferred embodiment of the present invention, the calculating module further calculates the transformers permissible overloading capacities based on condition indicators; and calculates P/Q constrains for the PCC of the distribution network, the DER, the EV and the load based on the transformers overloading capacities, the given range of P/Q exchange between the distribution network and the main grid, and/or the forecast results; in which the P/Q constrains include both maximum constrains and minimum constrains.

According to another preferred embodiment of the present invention, the coordinated control system further comprises an identifying module, configured to identify whether the calculated actual P/Q satisfy the P/Q constrains; and if not, the calculating module calculates the incremental P/Q references and/or circuit breaker commands for the DER, the EV and/or the load.

According to another preferred embodiment of the present invention, the coordinated control system further comprises an identifying module, configured to identify whether the actual frequency satisfies a preset frequency range; and if not, the calculating module calculates the incremental P references and/or circuit breaker commands for the DER, the EV and/or the load.

According to another preferred embodiment of the present invention, the coordinated control system further comprises an identifying module, configured to identify whether actual voltages satisfy the acceptable voltage levels; and if not, the calculating module calculates the incremental Q references and/or circuit breaker commands for the DER, the EV and/or the load.

According to another preferred embodiment of the present invention, the total P/Q references for the DER, the EV and/or the load can be updated by adding up the incremental P/Q references.

According to another preferred embodiment of the present invention, if the actual P of PCC of the distribution network is higher than the P maximum constrain of the distribution network, and/or the actual frequency of the distribution network is lower than the preset frequency range, the incremental P reference and/or circuit breaker commands of the DER increase the power generation based on the forecast results and P constrains of the DER; if still not satisfy or the actual P of the DER reaches the P constrain of the DER, the incremental P reference and/or circuit breaker commands of the EV decrease charging power and/or increase discharging power based on the forecast results and P constrains of the EV; and if still not satisfy or the actual P of the EV reaches the P constrain of the EV, the incremental P reference and/or circuit breaker commands of the load decrease loading level based on the forecast results and P constrains of the load.

According to another preferred embodiment of the present invention, if the actual P of PCC of the distribution network is lower than the P minimum constrain of the distribution network, and/or the actual frequency of the distribution network is higher than the preset frequency range, the incremental P reference and/or circuit breaker commands of the load will increase the loading level based on the forecast results and P constrains of the load; if still not satisfy or the actual P of the load reaches the P constrains of the load, the incremental P reference and/or circuit breaker commands of the EV will increase charging power and/or decrease discharging power based on the forecast results and P constrains of the EV; and if still not satisfy or the actual P of the EV reaches the P constrain of the EV, the incremental P reference and/or circuit breaker commands of the DER will decrease the power generation based on the forecast results and P constrains of the DER.

According to another preferred embodiment of the present invention, if the actual Q of PCC of the distribution network is higher than the Q constrain of the distribution network, and/or the actual voltages inside the distribution network are lower than the acceptable voltage levels, the incremental Q reference and/or circuit breaker commands of the EV will decrease inductive Q and/or increase capacitive Q based on the Q constrains of the EV; if still not satisfy or the actual Q reaches the Q constrain of the EV, the incremental Q reference and/or circuit breaker commands of the DER will decrease inductive Q and/or increase capacitive Q based on the Q constrains of the DER; and if still not satisfy or the actual Q reaches the Q constrain of the DER, the incremental Q reference and/or circuit breaker commands of the load will decrease inductive Q and/or increase capacitive Q based on the Q constrains of the load.

According to another preferred embodiment of the present invention, if the actual Q of PCC of the distribution network is lower than the Q constrain of the distribution network, and/or the actual voltages inside the distribution network are higher than the acceptable voltage levels, the incremental Q reference and/or circuit breaker commands of the EV will increase inductive Q and/or decrease capacitive Q based on the Q constrains of the EV; if still not satisfy or the actual Q reaches the Q constrain of the EV, the incremental Q reference and/or circuit breaker commands of the DER will increase inductive Q or decrease capacitive Q based on the Q constrains of the DER; and if still not satisfy or the actual Q reaches the Q constrain of the DER, the incremental Q reference and/or circuit breaker commands of the load will reduce inductive Q and/or decrease capacitive Q based on the Q constrains of the load.

The coordinated control method for the distribution network with DER and EV can take full utilization of the permissible overload capacity of distribution transformers to meet the power demand and maintain an acceptable voltage profile without sacrificing the DER generation when the distribution network operated in the grid-connection mode; in the islanding mode, the proposed method and system take full utilization of the power/energy capacity of distributive EV charging infrastructure to support the local generator to alleviate the impact of intermittence of DER on network voltage and frequency control.

BRIEF DESCRIPTION OF THE DRAWINGS

The subject matter of the invention will be explained in more details in the following description with reference to preferred exemplary embodiments which are illustrated in the drawings, in which.

DETAILED DESCRIPTION OF PREFERRED EMBODIMENTS

Exemplary embodiments of the present invention are described in conjunction with the accompanying drawings hereinafter. For the sake of clarity and conciseness, not all the features of actual implementations are described in the specification.

Figure 1:
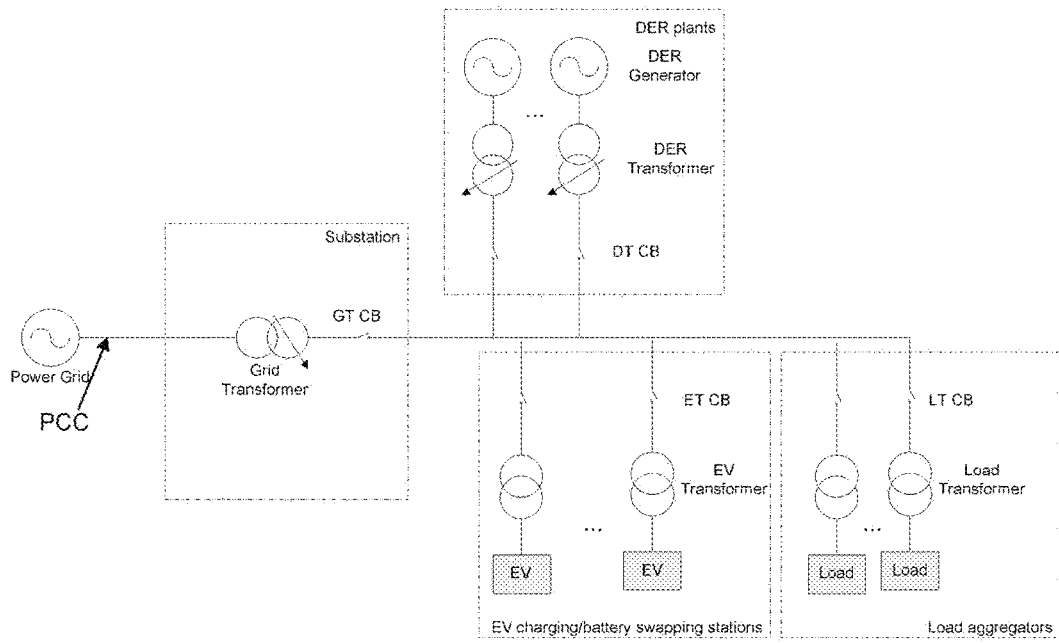
FIG. 1 illustrates a system layout of a distribution network.

The system layout of distribution network with DER and EV charging infrastructure integration is shown in FIG. 1, where the local area network is connected to the power grid through a circuit breaker and grid transformer in the substation. The local area network consists of distributive DERs, EV stations and load aggregators, which are connected to the feeders of the substation through individual transformers and circuit breakers. The DER plants could use gas-turbine generators and/or renewable energy sources like wind, PV generation, etc. EV stations represent EV charging stations and/or battery swapping stations. The load aggregators might have a downstream network which consists of conventional load, distributed charging poles, small scale renewable generations, etc.

Figure 2:
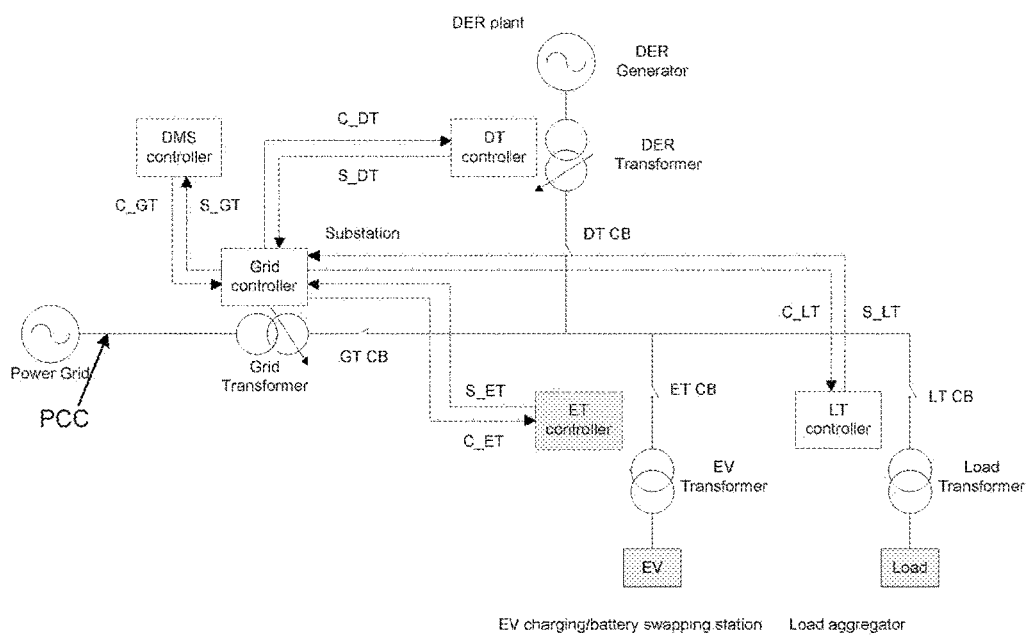
FIG. 2 illustrates a control system layout of a distribution network according to an embodiment of the present invention.

FIG. 2 illustrates a control system layout of a distribution network according to an embodiment of the present invention. To make it simple and easily explanation, only one exemplary DER plant, EV station and load aggregator is shown in this figure; however the skilled person in art know that the actual distribution network can includes more DER plants, EV stations and load aggregators.

As shown in FIG. 2, the grid transformer (GT) controller is a main controller responsible for executing the coordinated control method. To realize the proposed functions, other four controllers are also configured and involved for operation status feedback (reference symbol "S" in FIG. 2) and command execution (reference symbol "C" in FIG. 2). Specifically, they are Distribution Management System (DMS) controller, DER transformer (DT) controller, EV transformer (ET) controller and load transformer (LT) controller respectively.

The detailed information flow between the grid controller and the other four controllers are listed in Table 1.

TABLE 1

| information symbol and description thereof | | | |
|---|---|---|---|
| Symbol | Detailed description | Symbol | Detailed description |
| S_GT | 1. Measured active power (P)/reactive power (Q) power and voltage level (V) of PCC; 2. Overloading capacity of GT; 3. Status of GT CB. | C_GT | 1. Given range of P/Q exchange and the voltage level of the PCC point. |
| S_DT | 1. Measured P/Q and V of DT; 2. Overloading capacity of DT; 3. Status of DT CB; 4. Forecast of DER generation capacity. | C_DT | 1. Reference P/Q of DT; 2. Control command for DT CB. |
| S_ET | 1. Measured P/Q and V of ET; 2. Overloading capacity of ET; 3. Status of ET CB; 4. Forecast of EV charging and discharging capacity. | C_ET | 1. Reference P/Q of ET 2. Control command of ET CB. |
| S_LT | 1. Measured P/Q and V of LT; 2. Overloading capacity of LT; 3. Status of LT CB; 4. Forecast of loading level. | C_LT | 1. Reference P/Q of LT; 2. Control command of LT CB. |

Figure 3:
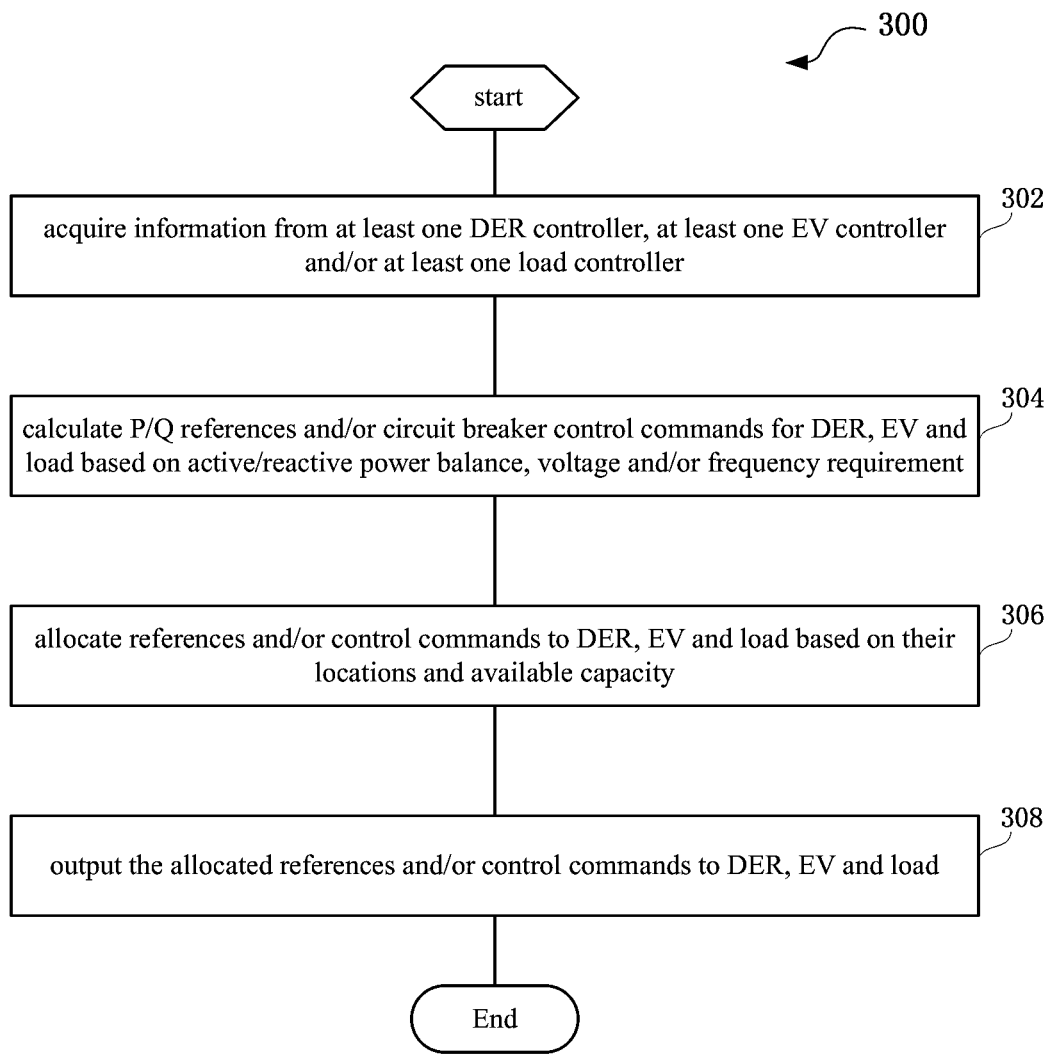
FIG. 3 illustrates a flow chart 300 of a coordinated control method for a distribution network with DER and EV according to an embodiment of the present invention.

FIG. 3 illustrates a flow chart of a coordinated control method for a distribution network with DER and EV according to an embodiment of the present invention.

As shown in FIG. 3, the coordinated control method for a distribution network comprises the following steps:

Step 302, acquiring information from at least one DER controller, at least one EV controller and/or at least one load controller. Such information includes voltages, currents, condition indicators, forecast results, status of circuit breakers and acceptable voltage levels etc. In detail, the voltages can be used to calculate the actual frequency; the voltages and currents can be used to calculate the actual P/Q; the condition indicators include transformer condition monitoring data, in which the transformer can be a transformer for the distribution network, the DER, the EV and/or the load; the forecast results include the DER generation capacity, EV charging/discharging capacity and/or loading level; and the status of circuit breakers include "on/off" status.

Step 304, calculating active/reactive power (P/Q) references and/or circuit breaker control commands for the DER, the EV and the load based on active/reactive power balance, voltage and/or frequency requirement.

Step 306, allocating the references and/or the control commands to the DER, the EV and the load based on their locations and available capacity.

Step 308, outputting the allocated references and/or control commands to the DER, the EV and the load.

According to a preferred embodiment of the present invention, the acquiring information step 302 further comprises: acquiring main grid references from a DMS, in which the main grid references comprise a given range of voltage level of PCC of the distribution network and a given range of P/Q exchange between the distribution network and the main grid.

According to a preferred embodiment of the present invention, the coordinated control method further comprises: feeding back the distribution network information to the DMS, in which the distribution network information includes the total active/reactive power consumption of the distribution network, the voltage level of PCC of the distribution network and the status of circuit breaker which connects the distribution network to the main grid.

It shall be noted that the circuit breaker which connects the distribution network to the main grid can be composed of a single circuit breaker or a number of parallel circuit breakers.

Figure 4:
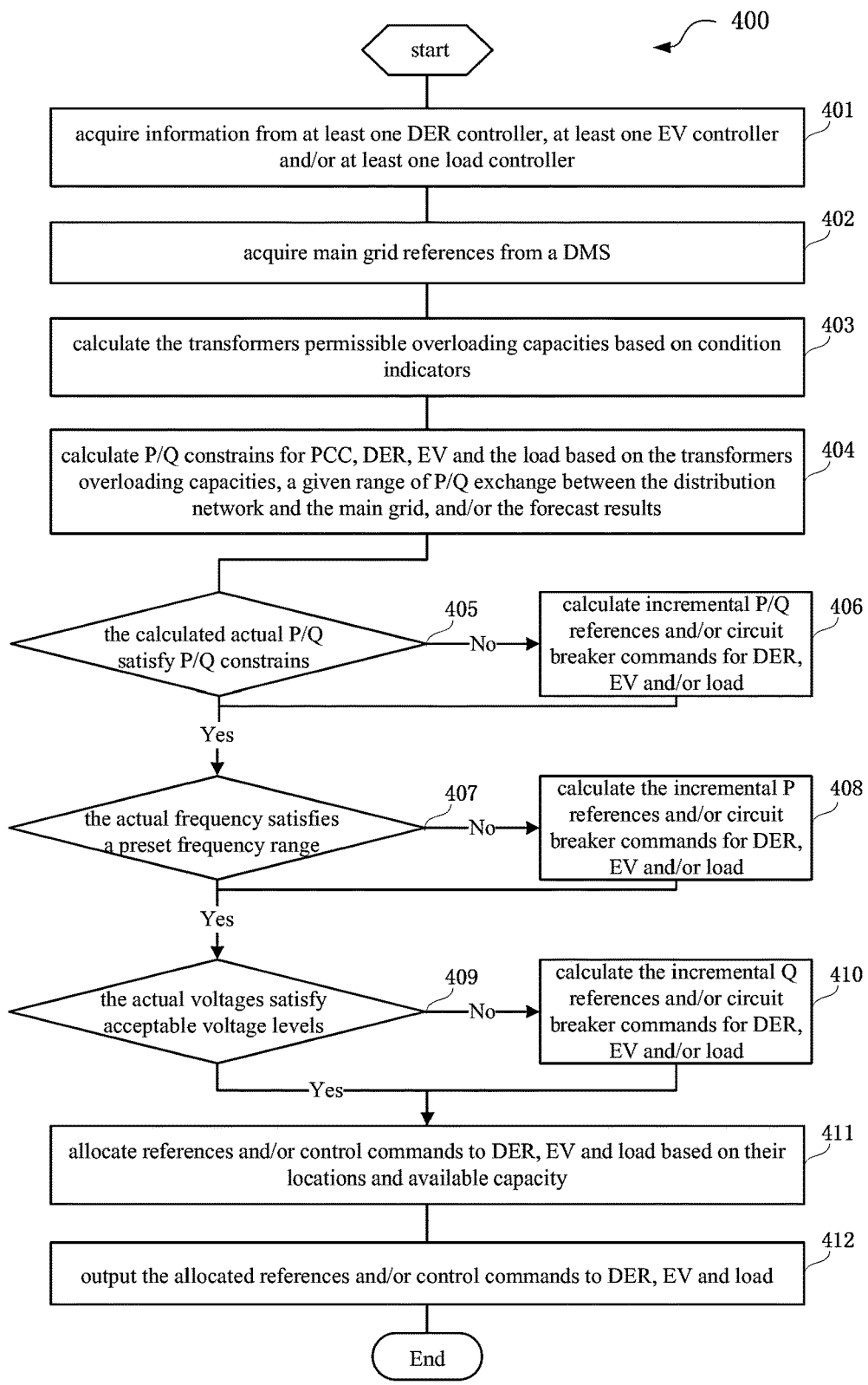
FIG. 4 illustrates a flow chart 400 of a coordinated control method for a distribution network with DER and EV according to another embodiment of the present invention.

FIG. 4 illustrates a flow chart of a coordinated control method for a distribution network with DER and EV according to another embodiment of the present invention.

As shown in FIG. 4, the coordinated control method for a distribution network comprises the following steps:

Step 401, acquiring information from at least one DER controller, at least one EV controller and/or at least one load controller.

Step 402, acquiring main grid references from a DMS.

Step 403, calculating the grid transformer permissible overloading capacity based on condition indicators.

Step 404, calculating P/Q constrains for PCC of the distribution network, the DER, the EV and the load based on the transformers overloading capacities, the given range of P/Q exchange between the distribution network and the main grid, and/or the forecast results; in which the P/Q constrains include both maximum constrains and minimum constrains.

Step 405, identifying whether the calculated actual P/Q satisfy the P/Q constrains; if not, go to step 406; otherwise, go to step 407.

Step 406, calculating the incremental P/Q references and/or circuit breaker commands for the DER, the EV and/or the load.

Step 407, identifying whether the actual frequency satisfies a preset frequency range; if not, go to step 408; otherwise, go to step 409.

Step 408, calculating the incremental P references and/or circuit breaker commands for the DER, the EV and/or the load.

Step 409, identifying whether actual voltages satisfy the acceptable voltage levels; if not, go to step 410; otherwise, go to step 411.

Step 410, calculating the incremental Q references and/or circuit breaker commands for the DER, the EV and/or the load.

Step 411, allocating the references and/or the control commands to the DER, the EV and the load based on their locations and available capacities.

Step 412, outputting the allocated references and/or control commands to the DER, the EV and the load. The skilled person in art knows that the whole process will be executed periodically.

It shall be noted that steps 401 and 402 can be executed in series or in parallel; or step 402 is executed before step 401 in an implementation of the present invention.

According to an embodiment of the present invention, the coordinated control method for a distribution network with DER and EV can be go to the step 407 or step 409 directly after step 404; that's to say, the power control steps "405 and 406", frequency control steps "407 and 408" or voltage control steps "409 and 410" can be done selectively in an actual implementation.

Figure 5:
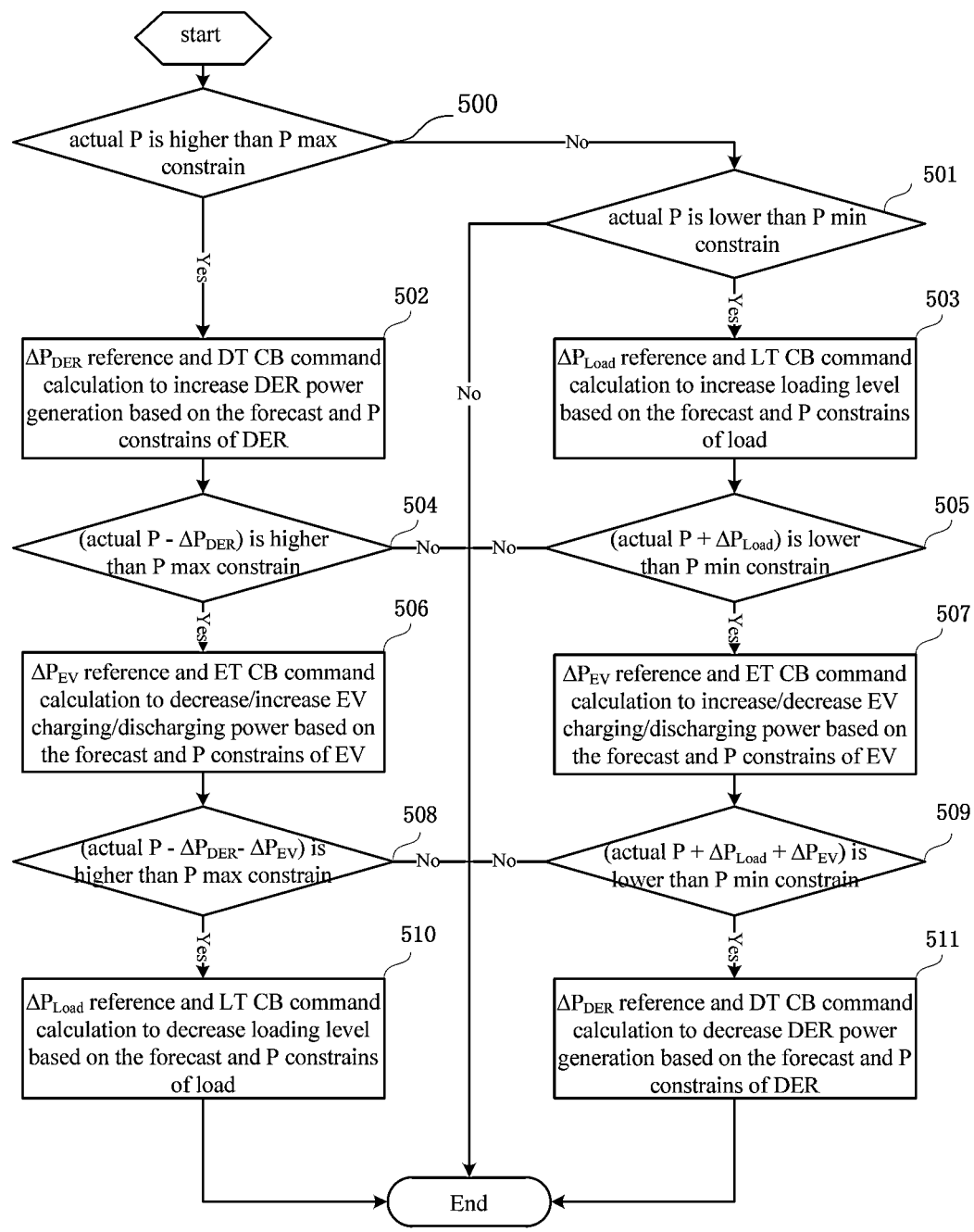
FIG. 5 illustrates a flow chart of an optimal active power control process in the coordinated control method for a distribution network with DER and EV according to another embodiment of the present invention.
Figure 6:
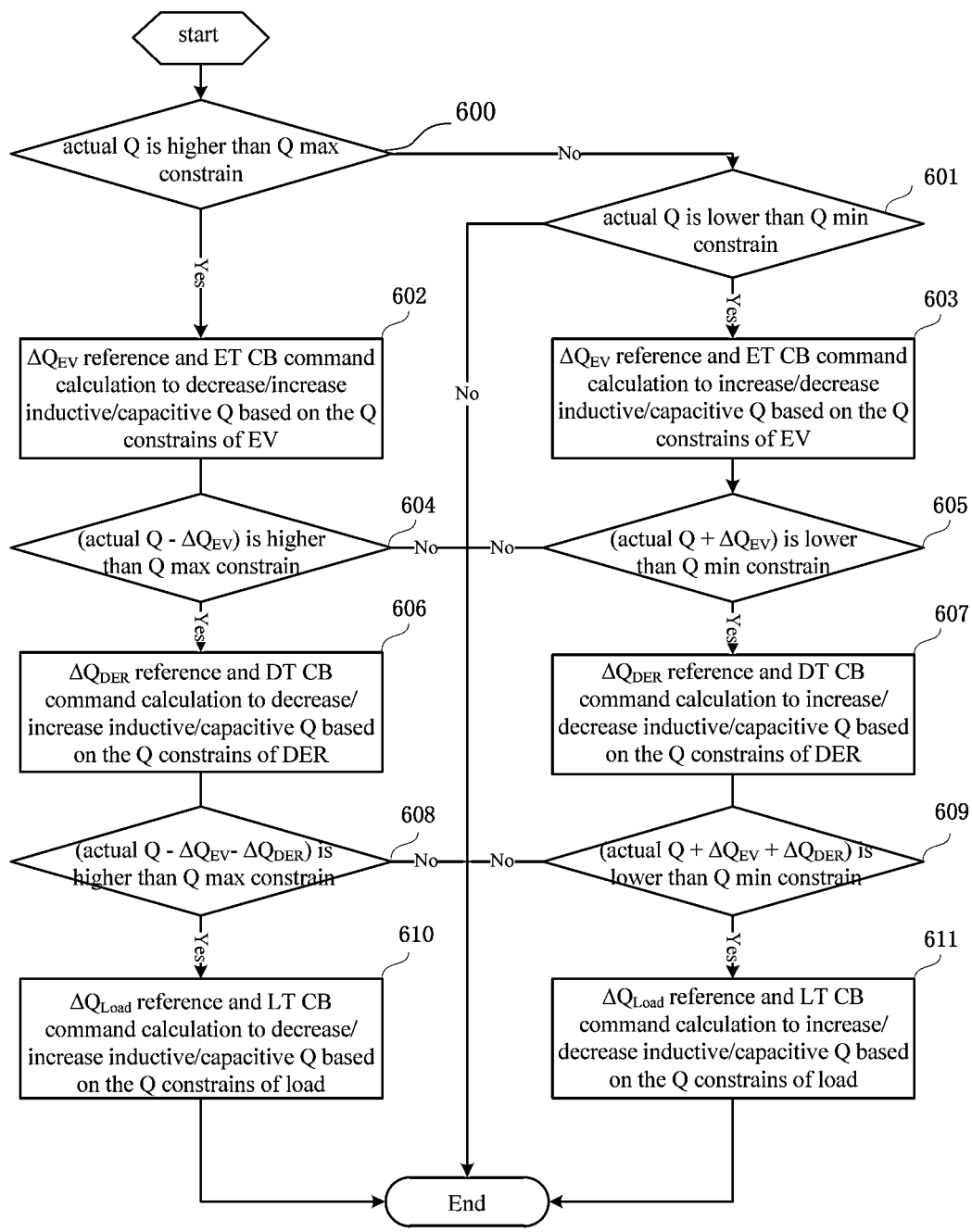
FIG. 6 illustrates a flow chart of an optimal reactive power control process in the coordinated control method for a distribution network with DER and EV according to another embodiment of the present invention.

FIG. 5 and FIG. 6 further illustrate the details of step 406 for optimal active power and reactive power control respectively. In detail, the optimal power control process is to control the active and reactive power of distribution network by utilizing the on-line condition monitoring information of distribution transformers at different locations to take full utilization of their permissible overload capacity to meet the short-term power requirement.

FIG. 5 illustrates a flow chart of an optimal active power control process in the coordinated control method for a distribution network with DER and EV according to another embodiment of the present invention.

As shown in FIG. 5, step 500, judge whether the actual P of PCC of the distribution network is larger than the P maximum constrain of the distribution network or not; if so, go to step 502; otherwise go to step 501.

Step 501, judge whether the actual P of PCC of the distribution network is lower than the P minimum constrain of the distribution network or not; if so, go to step 503.

Step 502, calculate the incremental P reference and/or circuit breaker commands of the DER to increase the power generation based on the forecast results and P constrains of the DER.

Step 503, calculate the incremental P reference and/or circuit breaker commands of the load to increase loading level based on the forecast results and P constrains of the load.

Step 504, identify whether the actual P of PCC of the distribution network deducts the incremental P reference of the DER is larger than the P maximum constrain of the distribution network or not; if so, go to step 506.

Step 505, identify whether the actual P of PCC of the distribution network pluses the incremental P reference of the load is lower than the P minimum constrain of the distribution network or not; if so, go to step 507.

Step 506, calculate the incremental P reference and/or circuit breaker commands of the EV to decrease charging power and/or increase discharging power based on the forecast results and P constrains of the EV.

Step 507, calculate the incremental P reference and/or circuit breaker commands of the EV to increase charging power and/or decrease discharging power based on the forecast results and P constrains of the EV.

Step 508, identify whether the actual P of PCC of the distribution network deducts the incremental P references of the DER and the EV is larger than the P maximum constrain of the distribution network or not; if so, go to step 510.

Step 509, identify whether the actual P of PCC of the distribution network pluses the incremental P references of the load and the EV is lower than the P minimum constrain of the distribution network or not; if so, go to step 511.

Step 510, calculate the incremental P reference and/or circuit breaker commands of the load to decrease loading level based on the forecast results and P constrains of the load.

Step 511, calculate the incremental P reference and/or circuit breaker commands of the DER to decrease DER power generation based on the forecast results and P constrains of the DER.

FIG. 6 illustrates a flow chart of an optimal reactive power control process in the coordinated control method for a distribution network with DER and EV according to another embodiment of the present invention.

As shown in FIG. 6, step 600, judge whether the actual Q of PCC of the distribution network is larger than the Q maximum constrain of the distribution network or not; if so, go to step 602; otherwise go to step 601.

Step 601, judge whether the actual Q of PCC of the distribution network is lower than the Q minimum constrain of the distribution network or not; if so, go to step 603.

Step 602, calculate the incremental Q reference and/or circuit breaker commands of the EV to decrease inductive Q and/or increase capacitive Q based on the Q constrains of the EV.

Step 603, calculate the incremental P reference and/or circuit breaker commands of the EV to increase inductive Q and/or decrease capacitive Q based on the Q constrains of the EV.

Step 604, identify whether the actual Q of PCC of the distribution network deducts the incremental Q reference of the EV is larger than the Q maximum constrain of the distribution network or not; if so, go to step 606.

Step 605, identify whether the actual Q of PCC of the distribution network pluses the incremental Q reference of the EV is lower than the Q minimum constrain of the distribution network or not; if so, go to step 607.

Step 606, calculate the incremental Q reference and/or circuit breaker commands of the DER to decrease inductive Q and/or increase capacitive Q based on the Q constrains of the DER.

Step 607, calculate the incremental Q reference and/or circuit breaker commands of the DER to increase inductive Q and/or decrease capacitive Q based on the Q constrains of the DER.

Step 608, identify whether the actual Q of PCC of the distribution network deducts the incremental Q references of the EV and the DER is larger than the Q maximum constrain of the distribution network or not; if so, go to step 610.

Step 609, identify whether the actual Q of PCC of the distribution network pluses the incremental Q references of the EV and the DER is lower than the Q minimum constrain of the distribution network or not; if so, go to step 611.

Step 610, calculate the incremental Q reference and/or circuit breaker commands of the load to decrease inductive Q and/or increase capacitive Q based on the Q constrains of the load.

Step 611, calculate the incremental Q reference and/or circuit breaker commands of the load to increase inductive Q and/or decrease capacitive Q based on the Q constrains of the load.

Figure 7:
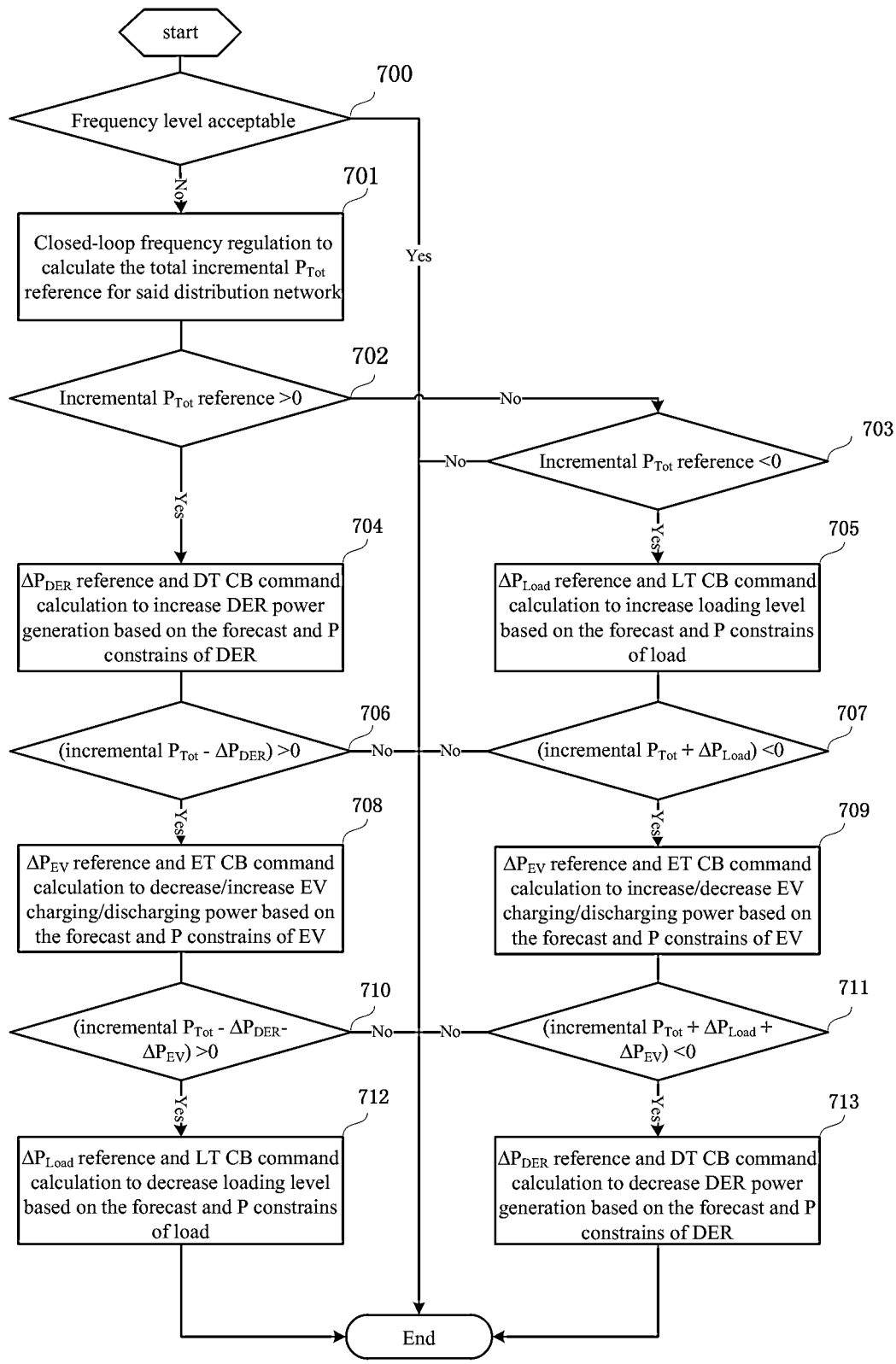
FIG. 7 illustrates a flow chart of a frequency control process in the coordinated control method for a distribution network with DER and EV according to another embodiment of the present invention.

FIG. 6 and FIG. 7 further illustrate the details for the frequency control process and the voltage control process, which supplement the optimal power control for the fine regulation of frequency and voltage of the distribution network during both grid-connected operation mode and islanding operation mode.

FIG. 7 illustrates the details of step 408 for frequency control. In detail, FIG. 7 illustrates a flow chart of a frequency control process in the coordinated control method for a distribution network with DER and EV according to another embodiment of the present invention.

As shown in FIG. 7, step 700, judge whether the actual frequency level is acceptable or not, for example, whether the actual frequency satisfies a preset frequency range; if not, go to step 701.

Step 701, enable closed-loop frequency regulation to calculate the total incremental $P_{Tot}$ reference for the distribution network.

Step 702, judge the incremental $P_{Tot}$ reference is larger than zero; if so, go to step 704; otherwise, go to step 703.

Step 703, judge the incremental $P_{Tot}$ reference is lower than zero or not; if so, go to step 705.

Step 704, calculate the incremental P reference and/or circuit breaker commands of the DER to increase DER power generation based on the forecast results and P constrains of the DER.

Step 705, calculate the incremental P reference and/or circuit breaker commands of the load to increase loading level based on the forecast results and P constrains of the load.

Step 706, judge the incremental $P_{Tot}$ reference deducts the incremental P reference of the DER is larger than zero or not; if so, go to step 708; otherwise, go to step 707.

Step 707, judge whether the incremental $P_{Tot}$ reference pluses the incremental P reference of the load is lower than zero or not; if so, go to step 709.

Step 708, calculate the incremental P reference and/or circuit breaker commands of the EV to decrease charging power and/or increase discharging power based on the forecast results and P constrains of the EV.

Step 709, calculate the incremental P reference and/or circuit breaker commands of the EV to increase charging power and/or decrease discharging power based on the forecast results and P constrains of the EV.

Step 710, identify whether the incremental $P_{Tot}$ deducts the incremental P references of the DER and the EV is larger than zero or not; if so, go to step 712.

Step 711, judge whether the incremental $P_{Tot}$ pluses the incremental P reference of the load and the EV is lower than zero or not; if so, go to step 713.

Step 712, calculate the incremental P reference and/or circuit breaker commands of the load to decrease loading level based on the forecast results and P constrains of the load.

Step 713, calculate the incremental P reference and/or circuit breaker commands of the DER to decrease DER power generation based on the forecast results and P constrains of the DER.

Figure 8:
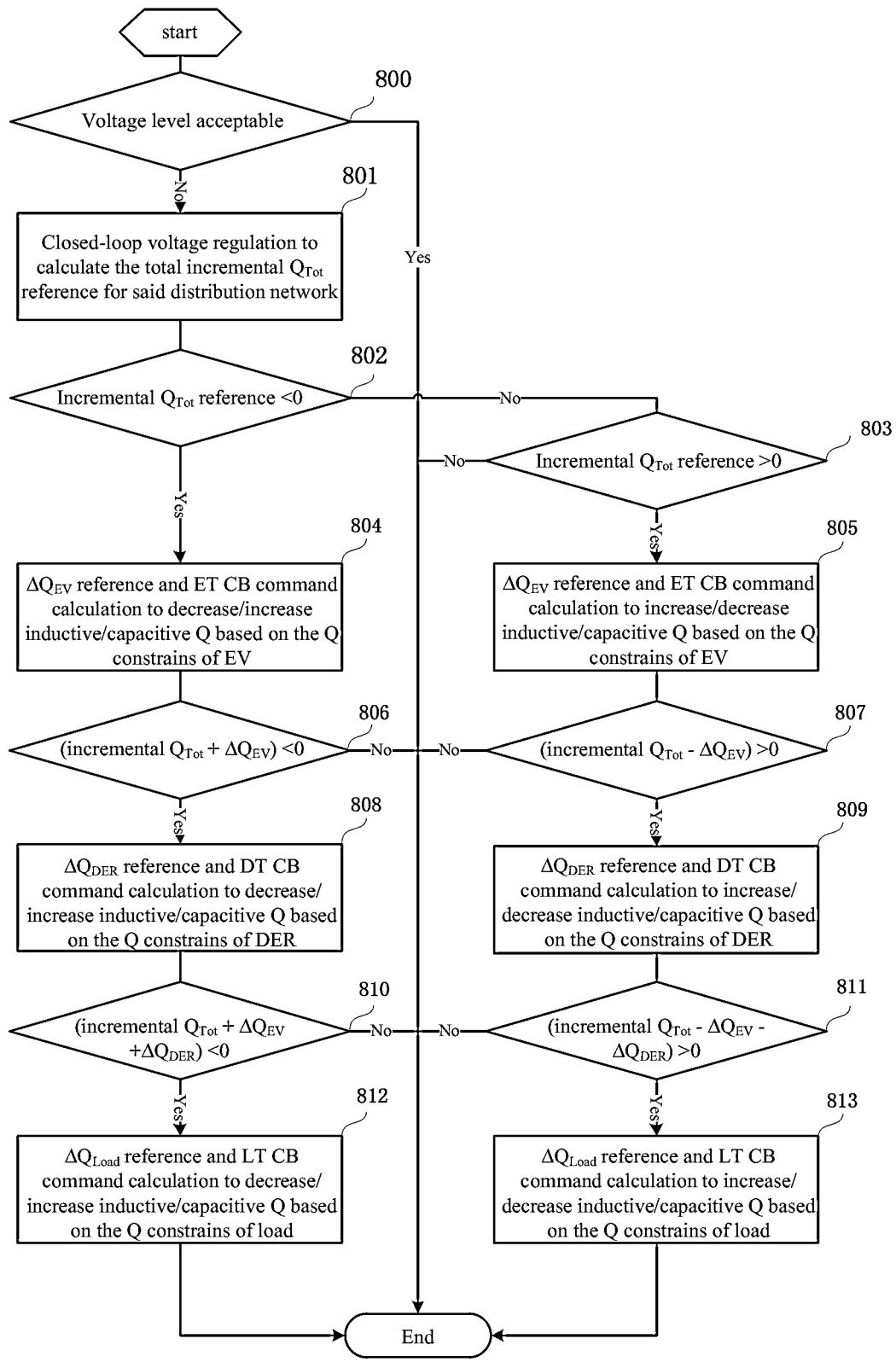
FIG. 8 illustrates a flow chart of a voltage control process in the coordinated control method for a distribution network with DER and EV according to another embodiment of the present invention.

FIG. 8 illustrates the details of step 410 for voltage control. Specifically, FIG. 8 illustrates a flow chart of a voltage control process in the coordinated control method for a distribution network with DER and EV according to another embodiment of the present invention.

As shown in FIG. 8, step 800, identify whether the voltage level is acceptable or not; if not, go to step 801.

Step 801, enable closed-loop voltage regulator to calculate the total incremental $Q_{Tot}$ reference for the distribution network.

Step 802, judge the incremental $Q_{Tot}$ reference is lower than zero; if so, go to step 804; otherwise, go to step 803.

Step 803, judge the incremental $Q_{Tot}$ reference is larger than zero or not; if so, go to step 805.

Step 804, calculate the incremental Q reference and/or circuit breaker commands of the EV to decrease inductive Q and/or increase capacitive Q based on the Q constrains of the EVT.

Step 805, calculate the incremental Q reference and/or circuit breaker commands of the EV to increase inductive Q and/or decrease capacitive Q based on the Q constrains of the EV.

Step 806, judge the incremental $Q_{Tot}$ reference pluses the incremental Q reference of the EV is lower than zero or not; if so, go to step 808; otherwise, go to step 807.

Step 807, judge whether the incremental $Q_{Tot}$ reference deducts the incremental Q reference of the EV is larger than zero or not; if so, go to step 809.

Step 808, calculate the incremental Q reference and/or circuit breaker commands of the DER to decrease inductive Q and/or increase capacitive Q based on the Q constrains of the DER.

Step 809, calculate the incremental Q reference and/or circuit breaker commands of the DER to increase inductive Q and/or decrease capacitive Q based on the Q constrains of the DER.

Step 810, judge whether the incremental $Q_{Tot}$ pluses the incremental Q references of the DER and the EV is lower than zero or not; if so, go to step 812.

Step 811, judge whether the incremental $Q_{Tot}$ deducts the incremental Q references of the DER and the EV is larger than zero or not; if so, go to step 813.

Step 812, calculate the incremental Q reference and/or circuit breaker commands of the load to decrease inductive Q and/or increase capacitive Q based on the Q constrains of the load.

Step 813, calculate the incremental Q reference and/or circuit breaker commands of the load to increase inductive Q and/or decrease capacitive Q based on the Q constrains of the load.

Figure 9:
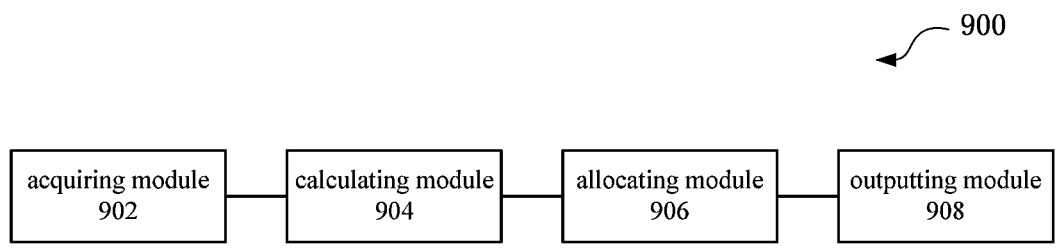
FIG. 9 illustrates a coordinated control system for a distribution network with DER and EV according to an embodiment of the present invention.

FIG. 9 illustrates a coordinated control system for a distribution network with DER and EV according to an embodiment of the present invention.

As shown in FIG. 9, the coordinated control system 900 includes an acquiring module 902, a calculating module 904, an allocating module 906 and an outputting module 908.

The acquiring module 902 is configured to acquire information from at least one DER controller, at least one EV controller and/or at least one load controller. the information includes voltages, currents, condition indicators, forecast results, status of circuit breakers and acceptable voltage levels, in which the voltages can be used to calculate the actual frequency; the voltages and currents be used to calculate the actual P/Q; the condition indicators include transformer condition monitoring data; in which the transformer can be a transformer for the distribution network, the DER, the EV and/or the load; the forecast results include the DER generation capacity, EV charging/discharging capacity and/or loading level; and the status of circuit breakers include "on/off" status.

The calculating module 904 is configured to calculate active/reactive power (P/Q) references and/or circuit breaker control commands for the DER, the EV and the load based on active/reactive power balance, voltage and/or frequency requirement. In a preferred embodiment, the acquiring module further acquires main grid references from a DMS, in which the main grid references comprise a given range of voltage level of PCC of the distribution network and a given range of P/Q exchange between the distribution network and the main grid.

The allocating module 906 is configured to allocate the references and/or the control commands to the DER, the EV and the load based on their locations and available capacity.

The outputting module 908 is configured to output the allocated references and/or control commands to the DER, the EV and the load.

According to a preferred embodiment of the present invention, the coordinated control system further comprises a feedback module 910, configured to feed back the distribution network information to the DMS, in which the distribution network information includes the total active/reactive power consumption of the distribution network, the voltage level of PCC of the distribution network and the status of circuit breaker which connects the distribution network to the main grid.

It shall be noted that in the coordinated control, the circuit breaker between the distribution network and the main grid can be composed of a single circuit breaker or a number of parallel circuit breakers.

In above coordinated control system, the calculating module further calculates the transformers permissible overloading capacities based on condition indicators; and calculates P/Q constrains for the point of common coupling (PCC) of the distribution network, the DER, the EV and the load based on the transformers overloading capacities, the given range of P/Q exchange between the distribution network and the main grid, and/or the forecast results; in which the P/Q constrains include both maximum constrains and minimum constrains.

The coordinated control system further comprises an identifying module, which configured to identify whether the calculated actual P/Q satisfy the P/Q constrains; if not, the calculating module calculates the incremental P/Q references and/or circuit breaker commands for the DER, the EV and/or the load. In another embodiment of the present, the identifying module is further configured to identify whether the actual frequency satisfies a preset frequency range; if not, the calculating module calculates the incremental P references and/or circuit breaker commands for the DER, the EV and/or the load. Furthermore, the identifying module is further configured to identify whether actual voltages satisfy the acceptable voltage levels; if not, the calculating module calculates the incremental Q references and/or circuit breaker commands for the DER, the EV and/or the load. Above mentioned P/Q references for the DER, the EV and/or the load can be updated by adding up the incremental P/Q references.

If the actual P of the point of common coupling (PCC) of the distribution network is higher than the P maximum constrain of the distribution network, and/or the actual frequency of the distribution network is lower than the preset frequency range, the incremental P reference and/or circuit breaker commands of the DER increase the power generation based on the forecast results and P constrains of the DER; if still not satisfy or the actual P of the DER reaches the P constrain of the DER, the incremental P reference and/or circuit breaker commands of the EV decrease charging power and/or increase discharging power based on the forecast results and P constrains of the EV; and if still not satisfy or the actual P of the EV reaches the P constrain of the EV, the incremental P reference and/or circuit breaker commands of the load decrease loading level based on the forecast results and P constrains of the load.

If the actual P of the point of common coupling (PCC) of the distribution network is lower than the P minimum constrain of the distribution network, and/or the actual frequency of the distribution network is higher than the preset frequency range, the incremental P reference and/or circuit breaker commands of the load will increase the loading level based on the forecast results and P constrains of the load; if still not satisfy or the actual P of the load reaches the P constrains of the load, the incremental P reference and/or circuit breaker commands of the EV will increase charging power and/or decrease discharging power based on the forecast results and P constrains of the EV; and if still not satisfy or the actual P of the EV reaches the P constrain of the EV, the incremental P reference and/or circuit breaker commands of the DER will decrease the power generation based on the forecast results and P constrains of the DER.

If the actual Q of the point of common coupling (PCC) of the distribution network is higher than the Q constrain of the distribution network, and/or the actual voltages inside the distribution network are lower than the acceptable voltage levels, the incremental Q reference and/or circuit breaker commands of the EV will decrease inductive Q and/or increase capacitive Q based on the Q constrains and the locations of the EV; if still not satisfy or the actual Q reaches the Q constrain of the EV, the incremental Q reference and/or circuit breaker commands of the DER will decrease inductive Q and/or increase capacitive Q based on the Q constrains and the locations of the DER; and if still not satisfy or the actual Q reaches the Q constrain of the DER, the incremental Q reference and/or circuit breaker commands of the load will decrease inductive Q and/or increase capacitive Q based on the Q constrains and locations of the load.

If the actual Q of the point of common coupling (PCC) of the distribution network is lower than the Q constrain of the distribution network, and/or the actual voltages inside the distribution network are higher than the acceptable voltage levels, the incremental Q reference and/or circuit breaker commands of the EV will increase inductive Q and/or decrease capacitive Q based on the Q constrains and the locations of the EV; if still not satisfy or the actual Q reaches the Q constrain of the EV, the incremental Q reference and/or circuit breaker commands of the DER will increase inductive Q or decrease capacitive Q based on the Q constrains and the locations of the DER; and if still not satisfy or the actual Q reaches the Q constrain of the DER, the incremental Q reference and/or circuit breaker commands of the load will reduce inductive Q and/or decrease capacitive Q based on the Q constrains and locations of the load.

Based on the teaching of the present invention, the person skilled in art appreciates the following technical benefits and effects:

1, The coordinated control method for a distribution network with DER and EV and corresponding control system provided in the present invention allow the distribution network to integrate large-scale DER generation and EV charging station with minimized negative impacts and improved operation performances.

2, By utilizing the real-time monitoring and capacity calculation of distribution transformers, the risk of unplanned outage due to transformer malfunction can be reduced which also helps to integrate more DER power into grid, and more electric vehicles can be accommodated in the distribution network.

3, Furthermore, with the coordination controller, the voltage/frequency variation caused by the fluctuation of renewable generations and/or EV fast charging can be well mitigated; which also helps to maintain voltage and frequency stability of the distribution network during islanding operation.

Though the present invention has been described on the basis of some preferred embodiments, those skilled in the art should appreciate that those embodiments should by no means limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A coordinated control method for a distribution network with distributed energy resource (DER) and electric vehicle (EV) and a plurality of transformers, wherein said coordinated control method comprises:
   acquiring information from a DER controller, an EV controller and a load controller structured to control a load;
   as a result of the acquiring information, calculating total active/reactive power (P/Q) references and circuit breaker control commands for said DER, said EV and said load based on active/reactive power balance, voltage and frequency requirement;
   allocating said references and said control commands to said DER, said EV and said load based on their locations and available capacity; and
   outputting the allocated references and the control commands to said DER, said EV and said load;
   wherein at least one of said calculating active/reactive power (P/Q) references, or circuit breaker control commands further comprises:
   calculating said transformers permissible overloading capacities based on condition indicators; and
   calculating P/Q constrains for a point of common coupling (PCC) of said distribution network, said DER, said EV and said load in which said P/Q constrains include both maximum constrains and minimum constrains based on at least one of:
said transformers permissible overloading capacities, a given range of P/Q exchange between said distribution network and said main grid, or forecast results.

2. The coordinated control method according to claim 1, wherein said information includes voltages, currents, condition indicators, forecast results, status of circuit breakers and acceptable voltage levels, in which said voltages are used to calculate the actual frequency;
   said voltages and said currents are used to calculate an actual P/Q;
   said condition indicators include transformer condition monitoring data for a first transformer of the plurality of transformers for at least one of said distribution network, said DER, said EV or said load;
   said forecast results include at least one of a DER generation capacity, an EV charging/discharging capacity or a loading level; and said status of circuit breakers include "on/off" status.

3. The coordinated control method according to claim 1, wherein said acquiring information step further comprises:
   acquiring main grid references from a distribution management system (DMS), in which said main grid references comprise a given range of voltage level of the point of common coupling (PCC) of said distribution network and the given range of P/Q exchange between said distribution network and said main grid.

4. The coordinated control method according to claim 3, wherein said coordinated control method further comprises:
   feeding back the distribution network information to said DMS, in which said distribution network information includes the total active/reactive power consumption of said distribution network, the voltage level of the point of common coupling (PCC) of said distribution network and a status of circuit breaker which connects said distribution network to said main grid.

5. The coordinated control method according to claim 4, wherein said circuit breaker is composed of a single circuit breaker or a number of parallel circuit breakers.

6. The coordinated control method according to claim 1, wherein said coordinated control method further comprises:
   identifying whether said calculated actual P/Q satisfy the P/Q constrains; and if not, calculating at least one of incremental P/Q references, or the circuit breaker control commands for at least one of said DER, said EV or said load.

7. The coordinated control method according to claim 1, wherein said coordinated control method further comprises:
identifying whether an actual frequency satisfies a preset frequency range; and
if not, calculating at least one of incremental P references, or the circuit breaker control commands for at least one of said DER, said EV or said load.

8. The coordinated control method according to claim 1, wherein said coordinated control method further comprises:
identifying whether actual voltages satisfy the acceptable voltage levels; and
if not, calculating at least one of incremental Q references, or the circuit breaker control commands for at least one of said DER, said EV or said load.

9. The coordinated control method according to claim 6, said total P/Q references for at least one of said DER, said EV or said load, are updated by adding up said incremental P/Q references.

10. The coordinated control method according to claim 6, wherein at least one of said calculating incremental P/Q references, or the circuit breaker control commands for at least one of said DER, said EV or said load further comprises:
if at least one of said actual P of PCC of said distribution network is higher than said P maximum constrain of said distribution network, or said actual frequency of said distribution network is lower than said preset frequency range, then at least one of said incremental P reference, or the circuit breaker control commands of said DER increase the power generation based on the forecast results and P constrains of said DER;
if at least one of the P/Q constrains still not satisfied or said actual P of said DER reaches said P constrain of said DER, then at least one of said incremental P reference, or said circuit breaker control commands of said EV perform at least one of decrease charging power, or increase discharging power based on the forecast results and P constrains of said EV; and
if at least one of the P/Q constrains still not satisfied or said actual P of said EV reaches said P constrain of said EV, then at least one of said incremental P reference or said circuit breaker control commands of said load decrease loading level based on the forecast results and P constrains of said load.

11. The coordinated control method according to claim 6, wherein at least one of said calculating incremental P/Q references or said circuit breaker control commands for at least one of said DER, said EV or said load further comprises:
if at least one of said actual P of PCC of said distribution network is lower than said P minimum constrain of said distribution network, or said actual frequency of said distribution network is higher than said preset frequency range, then at least one of said incremental P reference or circuit breaker control commands of said load increases the loading level based on said forecast results and P constrains of said load;
if at least one of the P/Q constrains still not satisfied or said actual P of said load reaches said P constrains of said load, then at least one of said incremental P reference or circuit breaker commands of said EV perform at least one of increase charging power, or decrease discharging power based on the forecast results and P constrains of said EV; and if at least one of the P/Q constrains still not satisfied or said actual P of said EV reaches said P constrain of said EV, then said at least one of incremental P reference or said circuit breaker control commands of said DER decrease the power generation based on the forecast results and P constrains of said DER.

12. The coordinated control method according to claim 6, wherein at least one of said calculating incremental P/Q references or said circuit breaker control commands for at least one of said DER, said EV or said load further comprises:
if at least one of said actual Q of PCC of said distribution network is higher than said Q constrain of said distribution network, or said actual voltages inside said distribution network are lower than said acceptable voltage levels, then at least one of said incremental Q reference of said circuit breaker control commands of said EV at least one of decrease inductive Q or increase capacitive Q based on said Q constrains of said EV;
if at least one of the P/Q constrains still not satisfied or said actual Q reaches said Q constrain of said EV, then at least one of said incremental Q reference or said circuit breaker control commands of said DER perform at least one of decrease inductive Q or increase capacitive Q based on said Q constrains of said DER; and
if the P/Q constrains still not satisfied or said actual Q reaches said Q constrain of said DER, then at least one of said incremental Q reference or said circuit breaker control commands of said load perform at least one of decrease inductive Q or increase capacitive Q based on said Q constrains of said load.

13. The coordinated control method according to claim 6, wherein at least one of said calculating incremental P/Q references or said circuit breaker control commands for at least one of said DER, said EV or said load further comprises:
if at least one of said actual Q of PCC of said distribution network is lower than said Q constrain of said distribution network, or said actual voltages inside said distribution network are higher than said acceptable voltage levels, then at least one of said incremental Q reference or said circuit breaker control commands of said EV perform at least one of increase inductive Q, or decrease capacitive Q based on said Q constrains of said EV;
if at least one of the P/Q constrains still not satisfied or said actual Q reaches said Q constrain of said EV, then at least one of said incremental Q reference or said circuit breaker control commands of said DER perform at least one of increase inductive Q, or decrease capacitive Q based on said Q constrains of said DER; and
if at least one of the P/Q constrains still not satisfied or said actual Q reaches said Q constrain of said DER, then at least one of said incremental Q reference or said circuit breaker control commands of said load perform at least one of reduce inductive Q, or decrease capacitive Q based on said Q constrains of said load.

14. The coordinated control method according to claim 1, wherein said P/Q constrains include both maximum constrains and minimum constrains based on at least one of: said transformers permissible overloading capacities or a range of P/Q exchange between said distribution network and said main grid.

* * * * *